United States Patent

Buchecker et al.

Patent Number: 5,309,265
Date of Patent: May 3, 1994

[54] SHORT PITCH LC LAYER WITH A TEMPERATURE INDEPENDENT $\lambda_0$ AND CONTAINING A NEMATIC LC DOPED WITH PLURAL CHIRAL ADDITIVES HAVING THE SAME TWIST SENSE

[75] Inventors: Richard Buchecker, Zurich; Jürg Fünfschilling, Basel; Martin Schadt, Seltisberg, all of Switzerland

[73] Assignee: Hoffmann-La Roche Inc., Nutley, N.J.

[21] Appl. No.: 981,907

[22] Filed: Nov. 23, 1992

Related U.S. Application Data

[63] Continuation of Ser. No. 690,893, filed as PCT/CH90/00250, Oct. 26, 1990, published as WO91/06613, May 16, 1991, abandoned.

[30] Foreign Application Priority Data

Nov. 1, 1989 [CH] Switzerland ................ 3948/89

[51] Int. Cl.$^5$ .............................................. G02F 1/13
[52] U.S. Cl. ........................................................ 359/102
[58] Field of Search ........................... 359/86, 96, 102

[56] References Cited

U.S. PATENT DOCUMENTS

| 4,780,240 | 10/1988 | Emoto et al. | 252/299.6 |
| 4,939,287 | 7/1990 | Bahr et al. | 560/66 |

FOREIGN PATENT DOCUMENTS

| 0211646 | 2/1987 | European Pat. Off. . |
| 0217240 | 4/1987 | European Pat. Off. . |
| 0218132 | 4/1987 | European Pat. Off. . |
| 0351746 | 1/1990 | European Pat. Off. . |

OTHER PUBLICATIONS

Göbl-Wunsch et al., "Temperature dependence . . . using several chiral additives", Zeitschrift für Naturforschung, A, 34A (5), pp. 594–599, 1979.

Schadt et al., "New Liquid Crystal Polarized Color Projection Principle", Jap. J. of Appl. Phys., vol. 29, No. 10, Oct. 1990, pp. 1974–1984.

*Primary Examiner*—William L. Sikes
*Assistant Examiner*—Ron Trice
*Attorney, Agent, or Firm*—George M. Gould; George W. Johnston

[57] ABSTRACT

Small-pitch cholesteric liquid crystal mixtures are temperature compensated. They are particularly useful when no, or only a slight, temperature dependence of the selective reflection is permissible, because a considerable temperature dependence would interfere with or render wanted effects impossible. They are composed of a nematic liquid crystal doped with at least two chiral additives satisfying the following conditions:

$$(1) \quad a(c_1 B_1 + c_2 B_2) = b(c_1 A_1 + c_2 A_2)$$

and $$(2) \quad 1/\lambda_0(T) = a(c_1 A_1 + c_2 A_2) + aT(c_1 B_1 + c_2 B_2) + bT(c_1 A_1 + c_2 A_2)$$

where $\lambda_0$ denotes the mean value of the wavelength band of the selective reflection $c_1 c_2, \ldots$ denote the concentrations of the chiral dopants and $A_1, B_1$ are coefficients of a progression.

3 Claims, No Drawings

SHORT PITCH LC LAYER WITH A TEMPERATURE INDEPENDENT $\lambda_0$ AND CONTAINING A NEMATIC LC DOPED WITH PLURAL CHIRAL ADDITIVES HAVING THE SAME TWIST SENSE This is a continuation of application Ser. No. 07/690,893, filed as PCT/CH90/00250, Oct. 26, 1990, published as WO91/06613, May 16, 1991, now abandoned.

Cholesteric liquid crystals with a small helix pitch are becoming increasingly used for various new areas of application, e.g. for polarised light sources [cf. for example Belayev, S. V., et al. In Jpn. J. Appl. Phys. 29, No. 4, (1990), L634] or in order to display temperatures by color changes of cholesteric coatings, It is known that the latter application makes use of the considerable temperature dependence of the helix pitch and hence the selective reflection color of cholesteric liquid crystals. This enables temperature changes of a few 0.1° C. to be displayed by shifting the selective reflective wavelength of a cholesteric coating.

There are applications, however, in which no, or only a slight, temperature dependence of the selective reflection of cholesteric liquid crystals is permissible because a considerable temperature dependence would interfere with or make it impossible to obtain the required effects.

It has already been shown that the temperature dependence of the helix pitch in the case of chiral nematic mixture can be reduced if they are doped with dextrorotatory and laevorotatory chiral additives [cf. for example, Gobi-Wunsch, A. et al. in Zeitschr. Neturforsch. 34a (1979) 594; Gerber. P. Phys. Lett. No. 3 (1980), 285]. These known processes, which result in large-pitch cholesteric liquid crystals, give a compensation of the temperature dependence of the electro-optical properties of nematic field effects.

The use of a similar process to compensate the temperature dependence of the mean value $\lambda_o$ of the selective reflection band of small-pitch cholesteric liquid crystals would be possible only if it were possible to use hitherto unknown dopants and processes for their use.

The object of the invention, therefore, is to indicate a process for the temperature compensation of the selective reflection of cholesteric coatings having small helix pitches and suitable mixtures or chiral dopants for this process.

To this end, according to the invention, a nematic liquid crystal is mixed with at least two chiral dopants which satisfy the conditions:

$$a(c_1B_1+c_2B_2)=b(c_1A_1+c_2A_2) \quad (1)$$

and $$1/\lambda_o(T)=a(c_1A_1+c_2A_2)+aT(c_1B_1+c_2B_2)+bT(c_1A_1+c_2A_2) \quad (2)$$

where $\lambda_o$ denotes the mean value of the wavelength band of the selective reflection $c_1, c_2, \ldots$ the concentration of the chiral dopants, and $A_1, B_1$ are coefficients in the following progression:

$$1/\lambda_o(T) = \sum_{k=1}^{n} c_k[A_k + B_k(T - 22°\text{ C.}) + \quad (3)$$

$$C_k(T - 22°\text{ C.})^2] \cdot [a + b(T - 22°\text{ C.})]$$

The approximation (1) is derived as follows: the temperature dependence of the twist $1/p$ of a nematic mixture doped with a number n of chiral additives of concentrations $c_k$ can be represented as follows:

$$1/p(T) = \quad (4)$$

$$\sum_{k=1}^{n} c_k [A_k + B_k(T - 22°\text{ C.}) + C_k(T - 22°\text{ C.})^2 + \ldots]$$

where the coefficients $B_1$ in the linear term substantially indicate the temperature dependence of the twist. If the temperature dependence of the mean refractive index $\bar{n}(T)$ is taken into account—which is proportional to the temperature dependence of the nematic degree of order $S(T)$—in accordance with $$\bar{n}(T) = \frac{2n_o(T) + \Delta n(T)}{2} = a + b(T - 22°\text{ C.}) \quad (5)$$

where $\Delta n$ denotes the optical anisotropy and $n_o$ the regular refractive index of the liquid crystal, then the following is obtained for the temperature dependence of the mean wavelength $\lambda_o$ of planar cholesteric coatings consisting of a nematic liquid crystal doped with n chiral additives:

$$1/\lambda_o(T) = \sum_{k=1}^{n} c_k[A_k + B_k(T - 22°\text{ C.}) + \quad (3)$$

$$C_k(T - 22°\text{ C.})^2] \cdot [a + b(T - 22°\text{ C.})]$$

If the quadratic and higher powers are disregarded this equation is reduced, for two chiral additives, to:

$$1/\lambda_o(T)=a(c_1A_1+c_2A_2)+aT(c_1B_1+c_2B_2)+bT(c_1A_1+c_2A_2) \quad (2)$$

Since in the present case the pitches of the two chiral additives must have an additive effect to give the small pitch required for selective reflection in the visible range, the coefficients $A_1$ and $A_2$ must have the same sign or be:

$$(7) \quad |c_1A_1+c_2A_2|\neq 0 \quad (7)$$

It thus follows from equation (2) that temperature compensation of $\lambda_o$ is possible only if two or more chiral additives satisfy the condition:

$$(1) \quad a(c_1B_1+c_2B_2)=b(c_1A_1+c_2A_2) \quad (1)$$

In the specific case in which the temperature dependence of $\bar{n}(T)$ can be disregarded, i.e. at temperatures far below the cholesteric-isotropic phase transition $T<<T_2$, it follows from equation (1) that the linear temperature coefficients $B_1$ of the two chiral additives have opposed signs and must satisfy the condition $|c_1B_1| = |c_2B_2|$. Alternatively, it is also possible to use chiral additives whose helix pitch temperature dependence is small, or is of a nature such that $\bar{n}(T)$ is just compensated. It is thus also possible to obtain $\lambda_o \neq f(T)$.

Two examples of mixtures which satisfy the above alternatives will be described below.

Mixture I consists of 76.0% by weight of a nematic liquid crystal described in detail hereinafter and made up of 26 components and doped with the following dextro-rotatory cholesteric additives:

5.% by weight diethyl (4S,5S)-2-[trans-4-(p-cyanophenyl)cyclohexyl]-1,3-dioxoiane-4,5-dicarboxylate
5.1% by weight (R)-1-methylheptyl-p[(2S,4R,5S)-5-decyl-4-methyl-m-dioxan-2-yl]benzoate
7.5% by weight 2,2'-p-phenylenebis[(2S,4R,5S)-4-methyl-5-octyl-m-dioxane]
6.4% by weight (R)-alpha-methylheptyl-4'-[(2S,4R,5S)-4-methyl-5-ocyl-m-dioxan-2-yl]-4-biphenylcarboxylate The nematic liquid crystal is made up as follows:
2.0% by weight 4'-ethyl-4-biphenylcarbonitrile
2.0% by weight 4'-propyl-4-biphenylcarbonitrile
7.0% by weight 4'-pentyl-4-biphenylcarbonitrile
7.0% by weight p-[trans-4[(E)-1+plentenyl]cyclohexyl]benzonitrile
4.0% by weight p-[trans-[(E)-propenyl]cyclohexyl]benzonitrile
3.0% by weight trans-4-(3-butenyl)-trans-4'-(p-fluorophenyl)[bicyclohexyl]
3.0% by weight trans-4-(p-fluorophenyl)-trans-4'-[(E)-propenyl][1,1'-bicyclohexyl]
3.0% by weight 4''-pentyl<p-terphenyl>-4-carbonitrile
3.0% by weight 4'-[trans-4-(3-butenyl)cyclohexyl]-4-biphenylcarbonitrile
2.0% by weight 4'-[trans-4[(E(-3-pentenyl]cyclohexyl]-4-biphenylcarbonitrile
2.0% by weight 4'-[trans-4-[(E)-propenyl]cyclohexyl]-4-biphenylcarbonitrile
6.0% by weight 1-[2-(trans-4-butylcyclohexyl)ethyl]-4-(trans-4-pentylcyclohexyl) benzene
4.0% by weight 1-[2-(trans-4-butylcyclohexyl)ethyl]-4-[trans-4-(4-pentenyl)cyclohexyl]benzene
3.0% by weight 4-[2-(trans-4-butylcyclohexnyl)ethyl]-4'-(trans-4-pentyl-cycloethyl)-1,1'-ethylenedibenzene
5.0% by weight ethyl p-[2-(trans-4-propylcyclohexyl)ethyl)phenyl ether
8.0% by weight ethyl pp-[2-(trans-4-pentylcyclohexyl)ethyl]phenyl ether
5.0% by weight 4-trans-pentyl-4'-trans-vinyl[1,1'-bicyclohexyl]
6.0% by weight methyl [4'-trans-[(E)-propenyl][1,1'-bicyclohexyl]-4-trans-yl]methyl ether
4.0% by weight 4'-trans-3-butenyl)[1,1'-bicyclohexyl]-4-trans-yl ethyl ether
3.0% by weight trans-4-methoxy-trans-4'-[(E)-3-pentenyl][bicyclohexyl]
2.0% by weight 1-ethoxy-4-[trans-4-[(E)-3-pentenyl]cycloexhyl]benzene
3.0% by weight (E)-2-butenyl p-(trans-4-propylcyclohexyl)phenyl ether
4.0% by weight (E)-2-butenyl p-(trans-4-pentylcyclohexyl)phenyl ether
3.0% by weight 1-ethyl-4'[trans-4-[(E)-3-pentenyl]cyclohexyl]biphenyl
4.0% by weight 1-[trans-4-[(E)-3-pentenyl]cyclohexyl]-4'-propylbiphenyl
3.0% by weight p-[trans-4-(3-pentenyl)cyclohenyl]phenyl trans-4-propyl-cyclohexanecarboxylate Mixture II consists of 75.1% by weight of a nematic liquid crystal described in detail below and consisting of 24 individual components and doped with the following laevorotatory cholesteric additives:

3.9% by weight 16beta-methyl-17-oxoandrost-5-an-3beta-yl acetate
7.3% by weight bis[(S)-1-methylheptyl]p-terphenyl-4,4''-dicarboxylate
6.9% by weight dibutyl (4R,5R)-2-[trans-4-(p-cyanophenyl)cyclohexyl]-1,3-dioxolane-4,5-dicarboxylate
6.8% by weight diethyl (4R,5R)-2-[trans-4-(p-cyanophenyl)cyclohexyl]-1,3-dioxolane-4,5-dicarboxylate The nematic liquid crystal is made up as follows:
3.0% by weight 4'ethyl-4-biphenylcarbonitrile
3.0% by weight 4'-propyl-4-biphenylcarbonitrile
5.0% by weight 4'-pentyl-4-biphenylcarbonitrile
4.0% by weight p-[trans-4-(3-butenyl)cyclohexyl]benzonitrile
8.0% by weight p-[trans-4-[(E)-1+pentenyl]cyclohexyl]benzonitrile
3.0% by weight 4''-pentyl<p-terphenyl>-4-carbonitrile
3.0% by weight 4'-[trans-4-(3-butenyl)cyclohexyl]-4-biphenylcarbonitrile
2.0% by weight 4'-trans-4-[(E)-3-pentenyl]cyclohexyl]-4-biphenylcarbonitrile
8.0% by weight 1-[2-(trans-4-butylcyclohexyl)ethyl]-4-(trans-4-pentylcyclohexyl)benzene
2.0% by weight 5-(trans-4-pentylcyclohexyl)-2[p-(trans-4-propylcyclohexyl) phenyl]pyrimidine
3.0% by weight 4-[[2-(trans-4-butylcyclohexyl)ethyl]-4'-(trans-4-pentyl-cyclohexyl)-1,1'-ethylenedibenzene
3.0% by weight p-cycanophenyl trans-4-[2-(trans-4-propylcyclohexyl)ethyl]cyclohexanecarboxylate
7.0% by weight ethyl p-[2-(trans-4-propylcyclohexyl)ethyl]phenyl ether
10.0% by weight ethyl p-[2-(trans-4-pentylcyclohexyl)ethyl]phenyl ether
6.0% by weight 4-trans-pentyl-4'-trans-vinyl[1,1'-bicyclohexyl]
5.0% by weight 4'-trans-(3-butenyl)[1,1'-bicyclohexyl]-4-trans-yl ethyl ether
3.0% by weight 4'-trans-(4-pentenyl)[1,1'-bicyclohexyl]-4-trans-yl ethyl ether
3.0% by weight trans-4-methoxy-trans-4'-[(E)-3-pentenyl][bicyclohexyl]
2.0% by weight 1-ethoxy-4-[trans-4-[(E)-3-pentenyl]cyclohexyl]benzene
3.0% by weight (E)-2-butenyl p-(trans-4-propylcyclohexyl)phenyl ether
4.0% by weight (E)-2-butenyl p-(trans-4-pentylcyclohexyl)phenyl ether
3.0% by weight 1-ethyl-4'-[trans-4-[(E)-3-pentenyl]cyclohexyl]biphenyl
4.0% by weight 1-[trans-4-[(E)-3-pentenyl]cyclohexyl]-4'-propylbiphenyl
3.0% by weight p-[trans-4-(3-pentenyl)cyclohexyl]phenyl trans-4-propyl-cyclohexanecarboxylate The measured properties of the two mixtures I and II are given in the following table:

| Parameter | Mixture I | Mixture II |
|---|---|---|
| $\lambda_0$ [nm] | 470 | 470 |
| $\Delta\lambda_{FWHM}$ [nm] | 35 | 35 |
| $d\lambda_0/dT$ [nm/°C.] | 0.10 | −0.10 |
| A [nm/% by weight] | 6.02 | 6.02 |
| $n_o$ | 1.498 | 1.496 |
| $\Delta n$ | 0.120 | 0.110 |
| Temperature range [°C.] | 0–50 | 0–50 |
| $T_0$ [°C.] | 57 | 63 |
| Direction of | L | R |

-continued

| Parameter | Mixture I | Mixture II |
|---|---|---|
| helix rotation | | |

In this table, $\lambda_o$ denotes the mean wavelength of the selective reflection: $\Delta\lambda_{FWHM}$ denotes the bandwidth of the selective reflection (FWHM=full width at half maximum); $d\lambda_o/dT$ denotes the temperature dependence of $\lambda_o$ in the operating temperature range; A is a coefficient which indicates the increases of $\lambda_o(c)$ due to the doping of the cholesteric mixture with its nematic "host" substance in accordance with the following formula: $\lambda_o(c)=\lambda_o+Ac$; $T_c$ denotes the cholesteric-isotropic transition temperature.

We claim:

1. A liquid crystal layer containing a liquid crystal composition with a central wavelength of selective reflection $\lambda_o$ wherein said liquid crystal layer has a short pitch (p) equal to about one order of magnitude less than the layer thickness;

said liquid crystal composition comprises a nematic liquid crystal compound doped with at least two chiral additives of the same twist sense, wherein said composition has the parameters a and b where a is the reciprocal of the refractive index of 22° C. and b is the linear temperature coefficient of the reciprocal of the refractive index and each chiral additive (k) has the parameters $A_K$ and $B_K$ and $A_K$ is the twisting power (1/p) at 22° C. and $B_k$ is the liner temperature coefficient of the twisting power; and the parameters a, b, $A_K$ and $B_k$ are such that $\lambda_o$ is temperature compensated to have temperature independence.

2. The liquid crystal layer of claim 1, wherein there are only two additives which have the respective concentrations $c_1$ and $c_2$ and satisfy the condition $a(c_1B_1+c_2B_2)=b(c_1A_1+c_2A_2)$.

3. The liquid crystal layer according to claim 1, wherein the chiral additives are:

a. diethyl (4S,5S)-2-trans-4-(p-cyanophenyl)cyclohexyl]-1,3-dioxolane-4,5-dicarboxylate, b. (R)-1-methylheptyl-p-[(2S,4R,5S)-5-decyl-4-methyl-m-dioxan-2-yl]benzoate, c. 2,2'-p-phenylenebis[(2S,4R,5S)-4-methyl-5-octyl-m-dioxane], and d. (R)-alpha-methylheptyl-4'-[(2S,4R,5S)-4-methyl-5-octyl-m-dioxan-2-yl]-4-biphenylcarboxylate.

* * * * *